(12) United States Patent
McGrory et al.

(10) Patent No.: US 6,481,320 B1
(45) Date of Patent: Nov. 19, 2002

(54) CROWN MOLDING HOLDER FOR MITER SAWS AND MITER BOXES

(76) Inventors: Roseanne C. McGrory, 233 Summerwind La., Harleysville, PA (US) 19438; John M. McGrory, Sr., 233 Summerwind La., Harleysville, PA (US) 19438

( * ) Notice: Subject to any disclaimer, the term of this patent is extended or adjusted under 35 U.S.C. 154(b) by 0 days.

(21) Appl. No.: 09/578,057

(22) Filed: May 24, 2000

(51) Int. Cl.$^7$ .............................. B26D 7/01; B23Q 3/00
(52) U.S. Cl. .................... 83/13; 83/468.3; 83/468.7; 83/471.3; 83/473; 83/477.1; 83/581; 269/319
(58) Field of Search .................. 83/13, 467.1, 468.1, 83/468.2, 468.3, 468.7, 471.2, 471.3, 473, 477.1, 490, 581; 269/40, 303, 304, 305, 306, 315, 319

(56) References Cited

U.S. PATENT DOCUMENTS

| | | | |
|---|---|---|---|
| 346,240 A | * 7/1886 | Soukup | 83/763 |
| 415,940 A | * 11/1889 | Davis | 83/767 |
| 752,406 A | * 2/1904 | Nichols | 83/766 |
| 1,798,342 A | * 3/1931 | Trepte | 269/303 X |
| 3,397,722 A | * 8/1968 | Long | 83/762 |
| 4,429,601 A | * 2/1984 | Taylor | 83/13 |
| 4,875,399 A | 10/1989 | Scott et al. | 83/468.3 |
| 4,907,482 A | 3/1990 | Hujo | 83/745 |
| 5,560,273 A | * 10/1996 | Keddie | 83/468.3 X |
| 5,711,123 A | 1/1998 | Lamont et al. | 52/287.1 |
| 5,730,434 A | * 3/1998 | Schoene et al. | 269/88 |
| 5,802,790 A | 9/1998 | Lamont et al. | 52/288.1 |
| 5,819,623 A | * 10/1998 | Sasaki et al. | 83/468.2 |

* cited by examiner

Primary Examiner—Clark F. Dexter
(74) Attorney, Agent, or Firm—Imre Balogh

(57) ABSTRACT

A workpiece holder having a horizontal bottom plate and a vertical side plate of integral construction used in combination with a motorized miter box for cutting miter joints in a workpiece, such as a crown molding. A method of supporting and cutting the workpiece contained in the workpiece holder is also disclosed.

12 Claims, 5 Drawing Sheets

CROWN MOLDING HOLDER FOR MITER SAWS AND MITER BOXES

BACKGROUND OF THE INVENTION

1. Field of the Invention

This invention relates to holders of decorative articles of wood for holding such articles during the preparative sawing process. More particularly, the invention relates to a holder or jig for holding a crown molding in place during the sawing process in producing miter joints therein.

2. Reported Developments

For certain decorative wood products, such as crown moldings, which are to be fitted to corners of various sizes, depending on ceiling heights and the requirement of how much of the corners are desired to be decorated, manufactured crown moldings produced in long pieces must be cut to the desired lengths. In cutting the manufactured crown moldings, two basic angles must be cut so that one end of the crown molding will conform to the ceiling, and the other end thereof will conform to the adjoining wall.

In preparing a crown molding, it is necessary to make two basic angle cuts, one on each end of the crown molding. The angle cut is typically about 52° and about 38° at the respective ends of the crown molding. The so-cut crown molding, when placed against a ceiling and an adjoining wall which form a 90° angle between them, will form the hypotenuse of the triangle. In addition to the two basic angle cuts in a crown molding, it is necessary to make two bevel cuts at the ends of the crown molding by cutting across the grain of the crown molding with the miter blade angled to the crown molding. In making a compound miter cut at each end of the crown molding, a miter angle and a bevel angle is used at the same time.

To make the angle cut and the bevel cut simultaneously with a hand-held power saw, the prior art has provided a guide for cutting compound miters in crown moldings with a circular saw, such as disclosed in U.S. Pat. No. 4,907,482. While the device is inexpensive as compared to motorized miter boxes, it does has some drawbacks associated with hand-held power saws, such as handling difficulties of the power saws in a safe manner.

Motorized miter boxes have been developed for cutting workpieces at various angles and are being marketed by several manufacturers. Such motorized miter boxes typically comprise a work table for supporting the workpieces to be cut, a fence against which the workpieces are registered to hold the same during the cutting process, and a power saw reciprocable with respect to the work table to cut the workpieces supported by the work table. The work table and saw are angularly adjustable with respect to the fence so that the cut can be made at a desired angle. The motorized miter boxes enable the user to cut simple miters wherein the workpieces lay flat against the table and the fence; they also enable the user to cut compound miters wherein the workpiece is cut at an angle to its longitudinal axes while no major planar surface of the workpiece is parallel to either the work table or the fence. When compound miters are cut, filler blocks are used to provide a support surface oriented at an acute angle to both the work table and the fence. The filler blocks are typically secured to the work table or the fence by removable means, such as bolts and screws.

The prior art has further provided a miter box attachment for cutting crown and frame moldings with a miter saw as disclosed in U.S. Pat. No. 4,875,399. The reference uses a pair of jigs slidably mounted on opposite lateral edges on the table to be movable toward and away from the fence. The jig also includes a registration block which supports a workpiece in a cocked position against the fence for cutting of a compound miter.

In the prior art devices using a miter saw, filler blocks are used to hold and support the workpiece in place during the cutting process. The filler blocks are attached to the fence or worktable of the miter saw by clamps or other removable means. In U.S. Pat. No. 4,875,399 the filler blocks are replaced by a pair of slidably adjustable jigs to allow the workpiece to be moved toward or away from the fence of the miter saw. While the use of these means help to accomplish the desired result, the present invention accomplishes the desired result without the use of these implements by the provision of a simple crown molding holder used in conjunction with the miter saw.

SUMMARY OF THE INVENTION

According to the present invention, a workpiece holder, such as a crown molding holder, is provided for use in combination with a motorized miter box for cutting miter joints which require a simultaneous bevel and miter cutting operation.

The motorized box comprises:
  a horizontal work table with a planar surface for supporting a workpiece;
  a vertical fence extending from the work table and forming a 90° angle therewith to provide a registration surface for the workpiece; and
  a miter saw having a reciprocating arm with a tiltable cutting blade supported on the work table and registered against the vertical fence.

The workpiece holder is positioned on the horizontal work table and against the vertical fence on the worktable, the workpiece holder comprising:
  a horizontal bottom plate slidably conforming to the planar surface of the work table;
  a vertical side plate slidably conforming to the vertical fence and projecting away from the horizontal bottom plate enclosing a 90° angle therewith, said horizontal bottom plate and said vertical side plate being integral with each other.

In order to securely hold a workpiece therein: the horizontal bottom plate of the workpiece holder is provided with a vertical integral rim extending longitudinally along the length of the horizontal bottom plate; and the vertical side plate is provided with a horizontal integral rim extending longitudinally along the length of the vertical side plate.

The workpiece holder is preferably made of 20 gauge galvanized steel which is magnetized to facilitate holding the workpiece holder against the fence of the miter table. The workpiece holder may also be made of aluminum and synthetic polymeric materials.

The workpiece holder may also be equipped with double-face pressure sensitive tape on the horizontal and vertical plates thereof to facilitate holding of the workpiece holder on the work table and against the fence of the miter box.

In use, the workpiece, such as a crown molding, is inserted into the work piece holder upside down with a portion of the molding intended to be cut extending away from and overhanging the workpiece holder so that the saw blade has no direct contact with the workpiece holder during the cutting process.

DETAILED DESCRIPTION OF THE INVENTION

Figure 1:
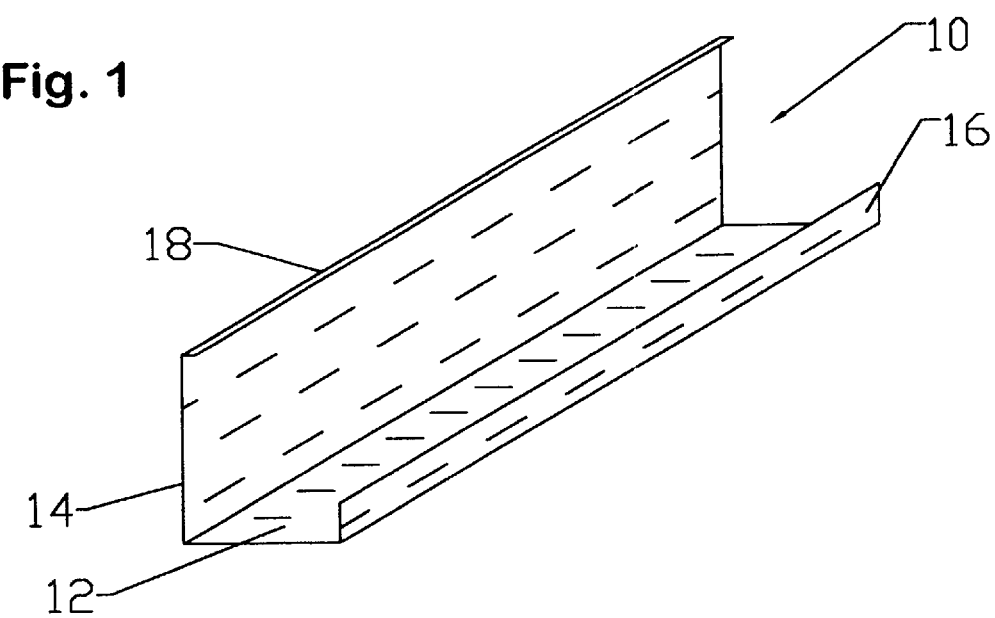
FIG. 1 is a perspective view of the crown molding holder of the present invention.
Figure 2:
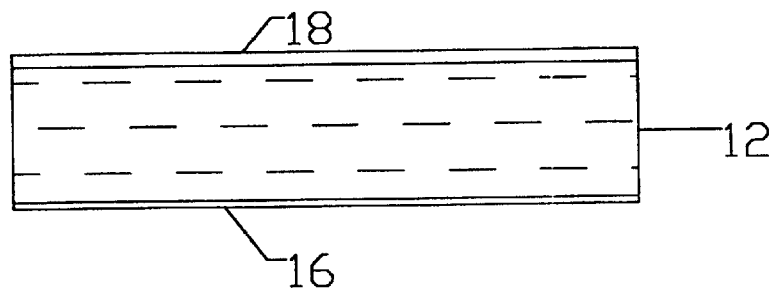
FIG. 2 is a top plan view thereof.

FIG. 1 shows the perspective view of the crown molding holder of the present invention generally designated by the numeral 10 comprising:

a flat, horizontal bottom plate 12 which is adapted to be placed on a work table of a miter saw;

a vertical side plate 14 which encloses a 90° angle with the flat, horizontal bottom plate and is integral therewith;

a vertical rim 16 extending from the flat, horizontal bottom plate;

a horizontal rim 18 extending inwardly toward the flat bottom plate, said rims are designed to securely hold a workpiece between the flat, horizontal bottom plate and the vertical side plate at an acute angle during the process of cutting the workpiece with the desired angles.

The crown molding holder is preferably made of 20 gauge galvanized steel, but could also be made of aluminum and polymeric materials of rigid or semi-rigid consistency such as:

polyethylene;
polypropylene;
polyvinyl chloride;
nylon;
polystyrene;
natural rubber;
acrylate-butadiene rubber;
cis-polybutamine;
chlorinated polyethylene elastomers;
polyalkylene oxide polymers;
ethylene vinyl acetate;
fluorosilicone rubbers;
butyl rubbers;
polyisobutane;
synthetic polyisoprene rubber;
silicone rubbers;
styrene-butamine rubbers;
tetrafluoroethylene propylene copolymers; and
thermoplastic-copolyesters.

When made of steel the crown molding holder may be magnetized so that it could be attracted and held to the fence of the miter saw. Attachment of the crown molding holder to the fence or work table may also be accomplished by the use of pressure-sensitive adhesive tapes.

Figure 3:
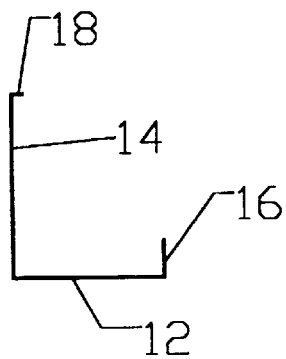
FIG. 3 is a left-side elevational view thereof, the right-side elevational view being a mirror image of the left-side elevational view.

As shown in FIGS. 1 and 3, flat, horizontal bottom plate 12 and the vertical side plate enclose a 90° angle between them so as to conform to a vertical fence in the miter saw at one side thereof and to the horizontal table of the miter saw at the other side thereof.

Figure 4:
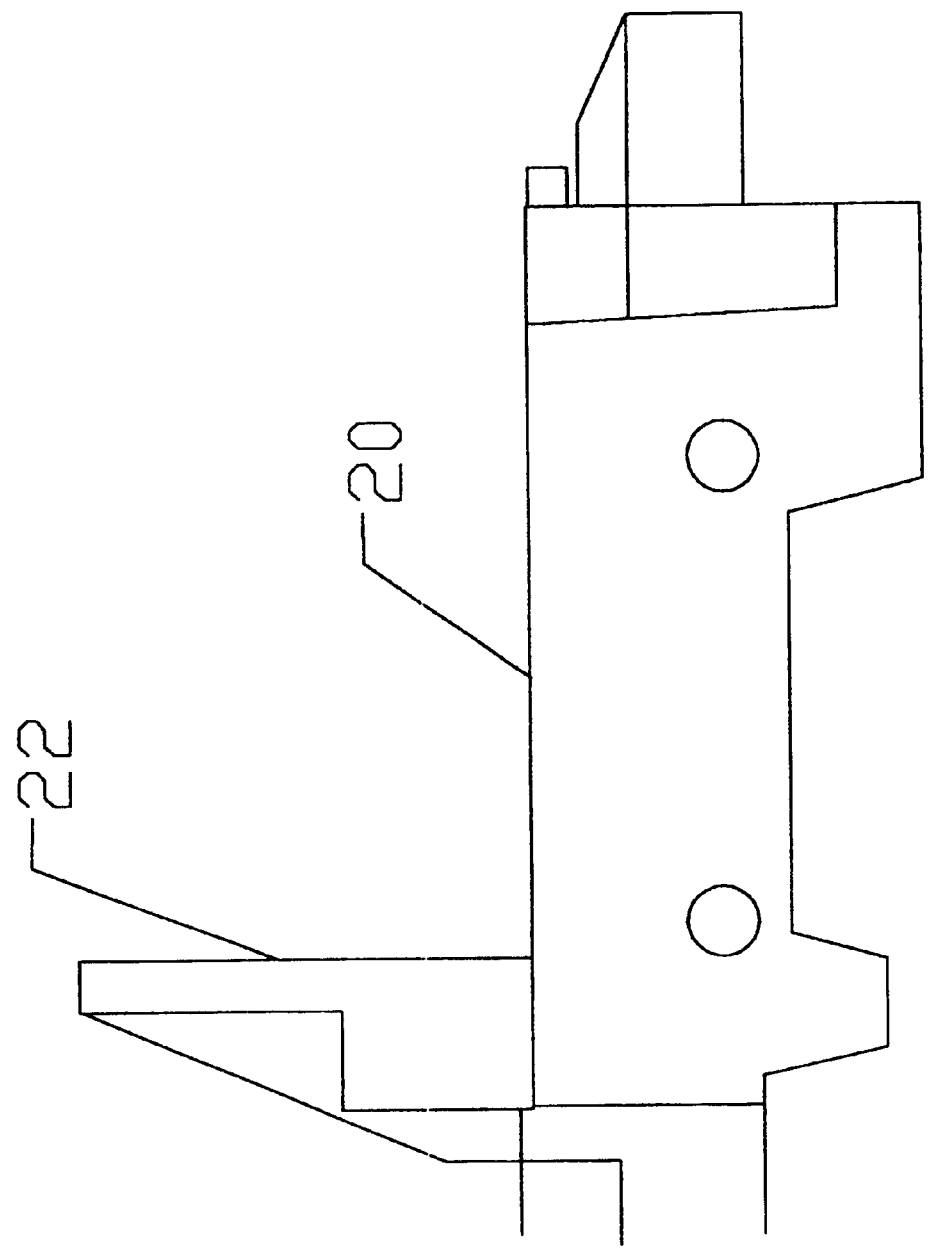
FIG. 4 is a schematic representation of a miter saw table showing the fence and the table in conjunction with which the crown molding holder is used.

Referring now to FIG. 4, there is shown in schematic view a miter saw table 20 and a miter saw fence 22 enclosing a 90° between them. The miter saw table and the miter saw fence are to receive the crown molding holder of the present invention in a slidable manner so that the crown molding holder may be advanced toward the miter saw for cutting a workpiece contained therein. The crown molding holder is pressed against the fence and the table to conform thereto during the cutting process.

Figure 5:
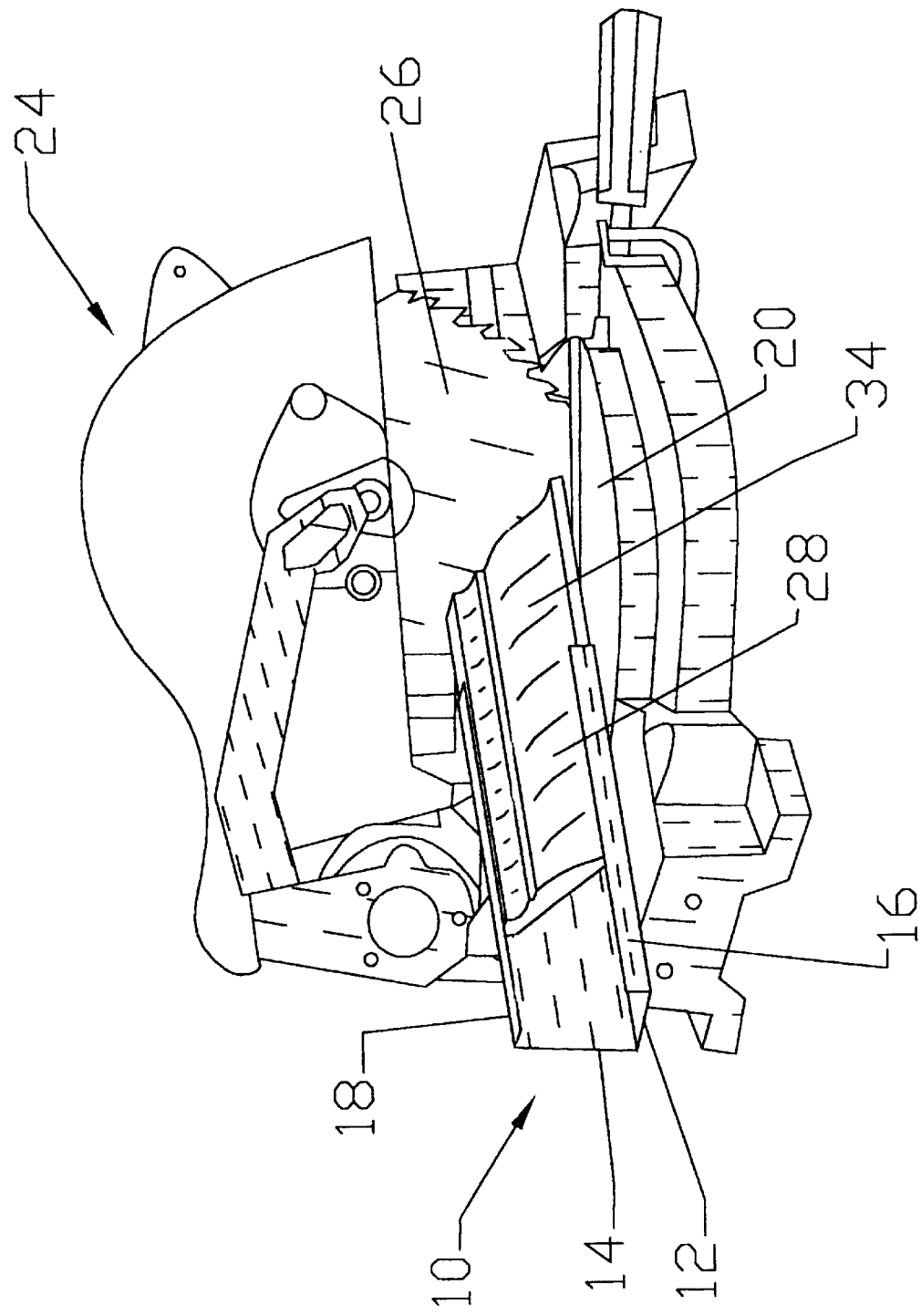
FIG. 5 is a fragmentary perspective view of a miter saw, and the crown molding holder of the present invention containing a crown molding abutting the fence and the table of the miter saw.

Referring to FIG. 5, there is shown a fragmentary perspective view of: a miter saw generally designated by the numeral 24; miter saw blade 26; miter saw table 20; miter saw fence 22; crown molding holder 10; and crown molding 28. The crown molding is inserted by a sliding motion into the crown molding holder 10 upside down. The crown molding forms the hypotenuse of the triangle defined by the vertical side plate 14 and the horizontal bottom plate 12 of the crown molding holder 10. The longitudinal edges of the crown molding abuts the vertical side plate 14 and horizontal bottom plate 12 and is tightly but slidably held therein by vertical rim 16 and horizontal rim 18 of crown molding holder A portion 34 of the crown molding 28 which is to be cut overhangs the crown molding holder so that the crown molding holder has no contact with the miter saw blade 26. The crown molding holder, with the crown molding therein, is placed with its vertical side portion against the fence of the miter saw with the portion of the crown molding overhanging the crown molding holder and is beneath the saw blade. The molding is then cut with the desired miter angle. Once the cut has been made, the completed crown molding is removed from the holder.

It is to be noted that the crown molding holder may be of various sizes to accommodate the width of various crown or frame moldings.

Figure 6:
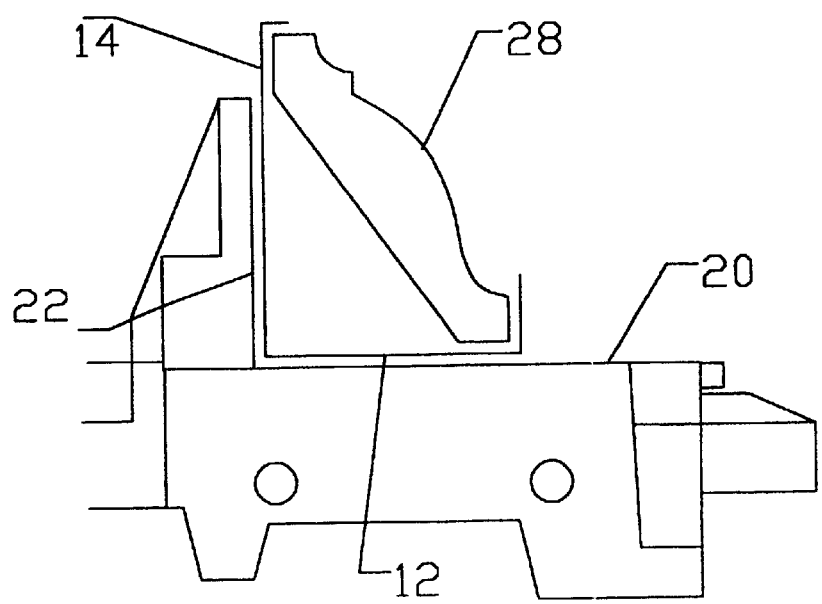
FIG. 6 is a schematic representation of a miter saw fence and the table showing the crown molding holder of the present invention abutting the fence and table, the crown molding holder containing the crown molding cut in FIG. 5.

FIG. 6 is a schematic representation of the miter saw fence and the miter saw table showing the crown molding holder abutting the fence and the table, the crown molding holder containing the crown molding therein which was cut as shown in FIG. 5.

Figure 7:
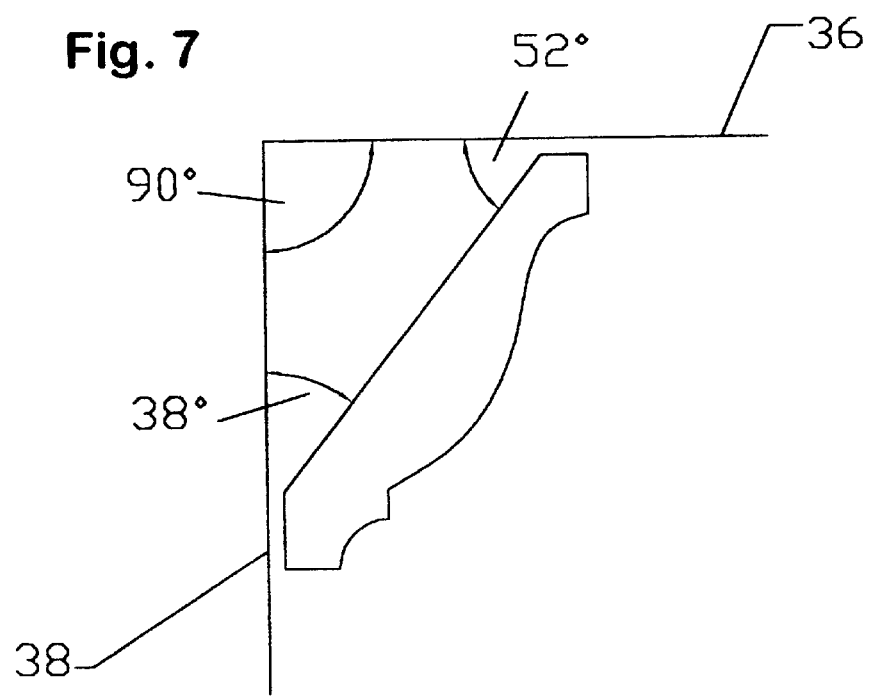
FIG. 7 is a schematic representation of the crown molding positioned in the corner enclosed by a ceiling and an adjoining wall.

FIG. 7 is a schematic representation of the crown molding positioned in the corner enclosed by a ceiling and an adjoining wall. The ceiling and the adjoining wall enclose a 90° angle between them. Typically, the crown molding has a 52° top rear angle, i.e. the section that fits against ceiling 36, and a 38° bottom rear angle, i.e. the section that fits flat against wall 38.

Figure 8:
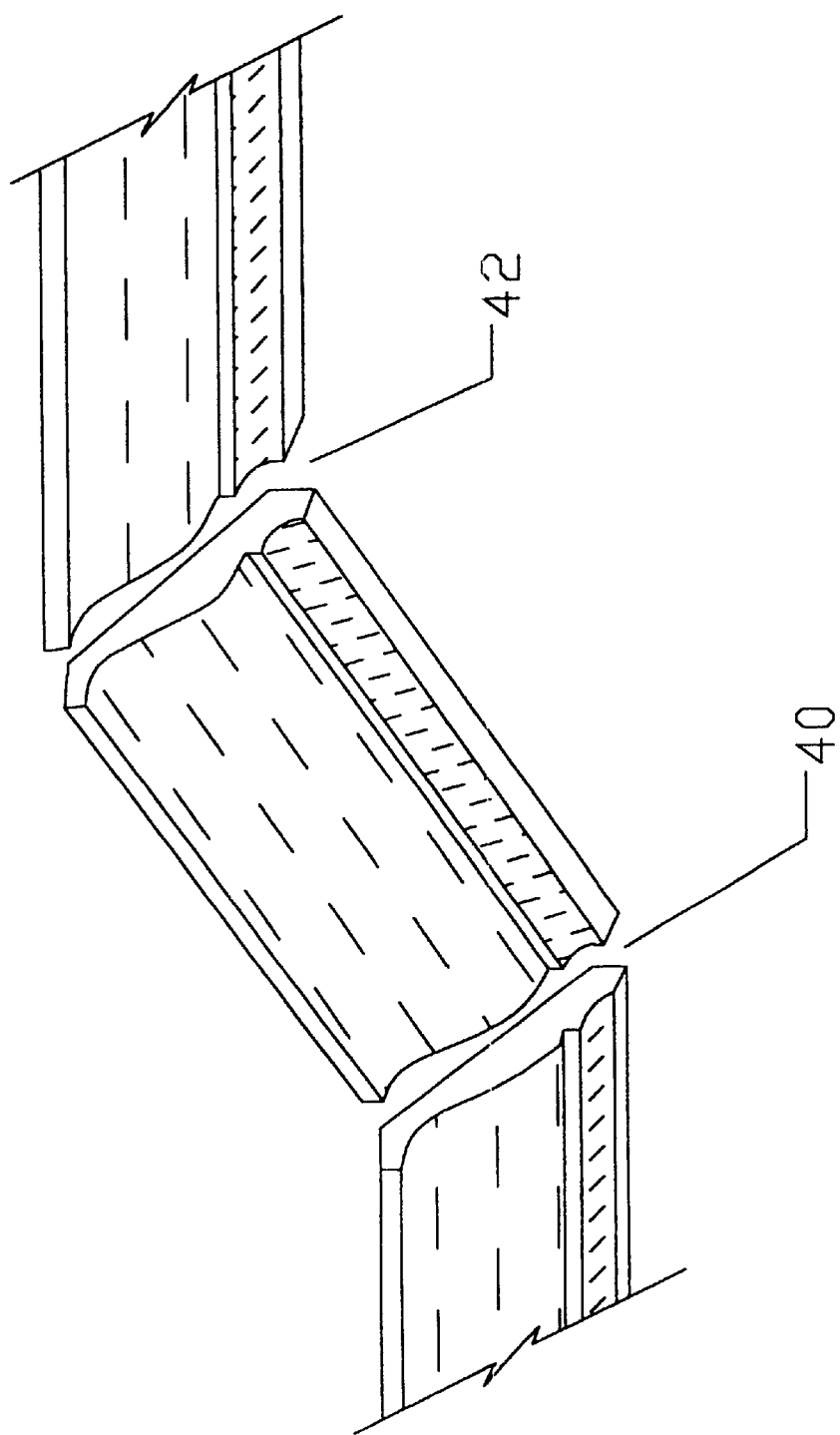
FIG. 8 shows the inside and outside corners of crown molding that is to be attached to wall and ceiling sections.

FIG. 8 shows the inside corner 40 and the outside corner 42 of crown molding that is to be attached to wall and ceiling sections.

The crown molding holder of the present invention may be imprinted with a ruler for facilitating measurements of the workpiece. It may be used for pre-drilling nail holes in the workpiece if such nail holes are desired.

As described, the crown molding holder of the present invention is easy to use and required no additional implements to maintain the workpiece in the desired position during the cutting process.

Crown molding holder generally designated 10
Flat, horizontal bottom plate of crown molding holder 12
Vertical side plate of crown molding holder 14
Vertical rim extending from horizontal bottom plate 16
Horizontal rim extending from vertical side plate inwardly toward the
flat, horizontal bottom plate 18
Miter saw table 20
Miter saw fence 22
Miter saw, generally designated 24
Miter saw blade 26
Crown molding 28
Longitudinal edges of crown molding 30, 32
Overhanging portion of crown molding 34
Ceiling 36
Wall 38

Having described the invention, it will be apparent to those skilled in the art that various modifications of the invention may be made without departing from the spirit and scope thereof as defined in the appended claims.

What is claimed is:

1. In an improved motorized miter saw for cutting miter joints having:
    a horizontal work table with a planar surface for supporting a workpiece;
    a vertical fence extending from said work table to provide a registration surface for the workpiece;
    a tiltable cutting blade on a reciprocating arm for cutting said workpiece supported on said work table and registered against said fence;
  wherein the improvement comprises:
    a workpiece holder positioned on said horizontal work table and against said vertical fence, said workpiece holder having:
      a horizontal bottom plate slidably conforming to the planar surface of said horizontal work table;
      a vertical side plate slidably conforming to said vertical fence and projecting away from said horizontal bottom plate enclosing a 90° angle therewith, said horizontal bottom plate and said vertical side plate being integral with each other; wherein
        said horizontal bottom plate having a vertical rim thereon extending longitudinally along the length of said horizontal bottom plate;
        said vertical side plate having a horizontal rim thereon extending longitudinally along the length of said vertical side plate; whereby
          said workpiece holder is adapted to receive and stabilize said workpiece for cutting by said tiltable cutting blade of said miter saw.

2. The improved motorized miter saw of claim 1 wherein said workpiece is a crown molding.

3. The improved motorized miter saw of claim 1 wherein said workpiece holder holds the workpiece at an acute angle between said horizontal bottom plate and said vertical side plate.

4. The improved motorized miter saw of claim 1 wherein said workpiece holder is made of a thin, rigid or semi-rigid material.

5. The improved motorized miter saw of claim 4 wherein said thin, rigid or semi-rigid material is a polymeric material selected form the group consisting of:
    polyethylene;
    polypropylene;
    polyvinyl chloride;
    nylon;
    polystyrene;
    natural rubber;
    acrylate-butadiene rubber;
    cis-polybutamine;
    chlorinated polyethylene elastomers;
    polyalkylene oxide polymers;
    ethylene vinyl acetate;
    fluorosilicone rubbers;
    butyl rubbers;
    polyisobutane;
    synthetic polyisoprene rubber;
    silicone rubbers;
    styrene-butamine rubbers;
    tetrafluoroethylene propylene copolymers; and
    thermoplastic-copolyesters.

6. The improved motorized miter saw of claim 1 wherein said workpiece holder is made of steel or aluminum.

7. The improved motorized miter saw of claim 6 wherein said steel is magnetized.

8. In an improved method for cutting a miter joint in a workpiece by a motorized miter saw having:
    a horizontal work table with a planar surface for supporting a workpiece;
    a vertical fence extending from said work table to provide a registration surface for the workpiece;
    a tiltable cutting blade on a reciprocating arm for cutting said workpiece supported on said work table and registered against said fence;
  wherein the improvement comprises:
    (a) providing a workpiece holder and positioning it on said horizontal work table and against said vertical fence, said workpiece holder having:
      a horizontal bottom plate slidably conforming to the planar surface of said horizontal work table;
      a vertical side plate slidably conforming to said vertical fence and projecting away from said horizontal bottom plate enclosing a 90° angle therewith, said horizontal bottom plate and said vertical side plate being integral with each other; wherein
        said horizontal bottom plate having a vertical rim thereon extending longitudinally along the length of said horizontal bottom plate;
        said vertical side plate having a horizontal rim thereon extending longitudinally along the length of said vertical side plate;
    (b) inserting a workpiece into said workpiece holder;
    (c) sliding said workpiece in said workpiece holder to have an end portion of said workpiece to overhang said workpiece holder; and
    (d) cutting a miter joint with the miter saw in said overhanging portion of said workpiece.

9. The improved method of claim 8 wherein said workpiece holder is made of a thin, rigid or semi-rigid material.

10. The improved method of claim 9 wherein said thin, rigid or semi-rigid material is a polymeric material selected form the group consisting of:
    polyethylene;
    polypropylene;

polyvinyl chloride;
nylon;
polystyrene;
natural rubber;
acrylate-butadiene rubber;
cis-polybutamine;,
chlorinated polyethylene elastomers;
polyalkylene oxide polymers;
ethylene vinyl acetate;
fluorosilicone rubbers;
butyl rubbers;
polyisobutane;
synthetic polyisoprene rubber;
silicone rubbers;
styrene-butamine rubbers;
tetrafluoroethylene propylene copolymers; and
thermoplastic-copolyesters.

11. The improved method of claim 8 wherein said workpiece holder is made of steel or aluminum.

12. The improved method of claim 11 wherein said steel is magnetized.

* * * * *